United States Patent
Greinke et al.

(10) Patent No.: US 12,438,579 B2
(45) Date of Patent: Oct. 7, 2025

(54) BEAMFORMING USING SPARSE ANTENNA ARRAYS

(71) Applicant: Viasat Inc., Carlsbad, CA (US)

(72) Inventors: Brian G. Greinke, Carlsbad, CA (US); John Bacigalupi, Carlsbad, CA (US); Craig A. Miller, Carlsbad, CA (US); Parker A. Robinson, Ocala, FL (US)

(73) Assignee: Viasat, Inc., Carlsbad, CA (US)

( * ) Notice: Subject to any disclaimer, the term of this patent is extended or adjusted under 35 U.S.C. 154(b) by 342 days.

(21) Appl. No.: 18/024,719

(22) PCT Filed: Sep. 2, 2021

(86) PCT No.: PCT/US2021/048908
§ 371 (c)(1),
(2) Date: Mar. 3, 2023

(87) PCT Pub. No.: WO2022/051531
PCT Pub. Date: Mar. 10, 2022

(65) Prior Publication Data
US 2023/0370133 A1    Nov. 16, 2023

Related U.S. Application Data

(60) Provisional application No. 63/075,017, filed on Sep. 4, 2020.

(51) Int. Cl.
*H04B 7/06* (2006.01)
*H04B 7/08* (2006.01)
*H04B 7/185* (2006.01)

(52) U.S. Cl.
CPC ........... *H04B 7/0617* (2013.01); *H04B 7/086* (2013.01); *H04B 7/18513* (2013.01)

(58) Field of Classification Search
CPC .. H04B 7/0617; H04B 7/086; H04B 7/18513; H04B 7/0469; H04B 7/0452;
(Continued)

(56) References Cited

U.S. PATENT DOCUMENTS

| | | |
|---|---|---|
| 2014/0177607 A1 | 6/2014 | Li et al. |
| 2015/0016379 A1 | 1/2015 | Nam et al. |

(Continued)

FOREIGN PATENT DOCUMENTS

| | | |
|---|---|---|
| EP | 3016428 A1 | 5/2016 |
| JP | 2016533108 A | 10/2016 |

(Continued)

OTHER PUBLICATIONS

Winter S.P. et al., "Antenna Diversity Techniques for Enhanced Jamming Resistance in Multi-Beam Satellites," MILCOM 2016-2016 IEEE Military Communications Conference, Baltimore MD, USA 2016, pp. 618-623, doi: 10.1109/MILCOMM.2016.7795396.

(Continued)

*Primary Examiner* — Minh Trang T Nguyen
(74) *Attorney, Agent, or Firm* — Holland & Hart LLP

(57) ABSTRACT

An antenna array may be associated with forming discovery beams within a geographic area, where each discovery beam may be formed by a corresponding set of antennas of the antenna array and cover a discovery area within the geographic area. Preambles transmitted from terminals within a discovery area of a discovery beam may be detected using the antenna array. Based on detecting a preamble using a discovery beam, a presence of a terminal in a corresponding discovery area may be determined. Based on determining the presence of the terminal, signals detected at a second set of antennas of the antenna array may be processed according to beam coefficients to obtain a beam signal of a communication beam that includes a beam coverage area encom- (Continued)

passing a position of the terminal. Each detected signal may comprise a respective component of a signal transmitted by the terminal.

30 Claims, 6 Drawing Sheets

(58) Field of Classification Search
CPC .. H04B 7/0695; H04B 7/088; H04B 7/18519; H04B 7/18545
See application file for complete search history.

(56) References Cited

U.S. PATENT DOCUMENTS

| | | |
|---|---|---|
| 2015/0263802 A1 | 9/2015 | Dankberg et al. |
| 2019/0253866 A1 | 8/2019 | Abedini et al. |
| 2020/0007227 A1 | 1/2020 | Becker et al. |
| 2021/0067981 A1* | 3/2021 | Nilsson ............... H04W 72/046 |

FOREIGN PATENT DOCUMENTS

| | | |
|---|---|---|
| RU | 2656235 C1 | 6/2018 |
| WO | WO2019174745 A1 | 9/2019 |
| WO | 2020167897 | 8/2020 |

OTHER PUBLICATIONS

MTI:"Discussion on CSI feedback for LEO Satellites in NTN", 3GPP Draft; R1-1900819 Discussion on CSI Feedback for LEO Satellites in NTN, 3rd Generation Partnership Project (3GPP), Mobile Competence Centre; 650; Route des Lucioles; F-06921 Sophia-Antipolis CE, vol. RAN WG1, No. Taipei, Taiwan; Jan. 21, 2019-Jan. 25, 2019—Jan. 12, 2019, XPO515576357, Retrieved from the Internet: URL: HTTP://WWW.3GPP.ORG/FTP/TSG%&5fRAN/wg1%5fr11/tsgr1%5fah/nr%5fah%5f1901/dOCS/r1%2d1900819%2eZIP (retrieved on Jan. 12, 2019] the whole document.

QUALCOMM Incorporatged: RACH Procedure and UL Timing Control for NTN, 3GPP Draft; R1-19122956, 3rd Generation Partnership Project (3GPP), Mobile Competence Centre; 650; Route Des Lucioles; F-06921 Sophia-Antipolis Cedex; France, vol. RAN WG1, No. Reno, USA; Nov. 18, 2019-Nov. 22, 2019 Nov. 9, 2019, XP051823718, Retrieved from the Internet: URL; https://gtp.3gpp.org/tsg_ran/WG1_RL1/TSGR1_99/Docs/R1-192956.zip_R1-1912956 RACH Procedure and UL Timing Control for NTN.docs [retrieved on Nov. 9, 2019] the whole document.

International Search and Written Opinion, PCT/US2021-048908, Dated Mar. 22, 2022, 26 pages.

* cited by examiner

BEAMFORMING USING SPARSE ANTENNA ARRAYS

CROSS REFERENCE

The present Application is a 371 national phase filing of International Patent Application No. PCT/US2020/048908 by Greinke et al., entitled "Beamforming Using Sparse Antenna Arrays" filed Sep. 4, 2021, and to U.S. Provisional Patent Application No. 63/075,017 by Greinke et al., entitled "Beamforming Using Sparce Antenna Arrays" filed Sep. 4, 2020, each of which is assigned to the assignee hereof and each of which is expressly incorporated by reference in its entirety herein.

BACKGROUND

The following relates generally to communications, including beamforming using sparse antenna arrays.

Communications devices may communicate with one another using wired connections, wireless (e.g., radio frequency (RF)) connections, or both. Wireless communications between devices may be performed using wireless spectrum that has been designated for a service provider, wireless technology, or both. In some examples, the amount of information that can be communicated via a wireless communications network is based on an amount of wireless spectrum designated to the service provider, and an amount of frequency reuse within the region in which service is provided. Wireless communications (e.g., cellular communications, satellite communications, etc.) may use beamforming and multiple-input multiple-output (MIMO) techniques for communications between devices to increase frequency reuse, however, providing a high level of frequency reuse in some types of communication systems such as satellite communications presents challenges.

SUMMARY

An antenna array may be associated with forming discovery beams within a geographic area, where each discovery beam may be formed by a corresponding set of antennas of the antenna array and cover a discovery area within the geographic area. Preambles transmitted from terminals within a discovery area of a discovery beam may be detected using the antenna array. Based on detecting a preamble using a discovery beam, a presence of a terminal in a corresponding discovery area may be determined. Based on determining the presence of the terminal, signals detected at a second set of antennas of the antenna array may be processed according to beam coefficients to obtain a beam signal of a communication beam that includes a beam coverage area encompassing a position of the terminal. Each detected signal may comprise a respective component of a signal transmitted by the terminal.

DETAILED DESCRIPTION

Figure 1:
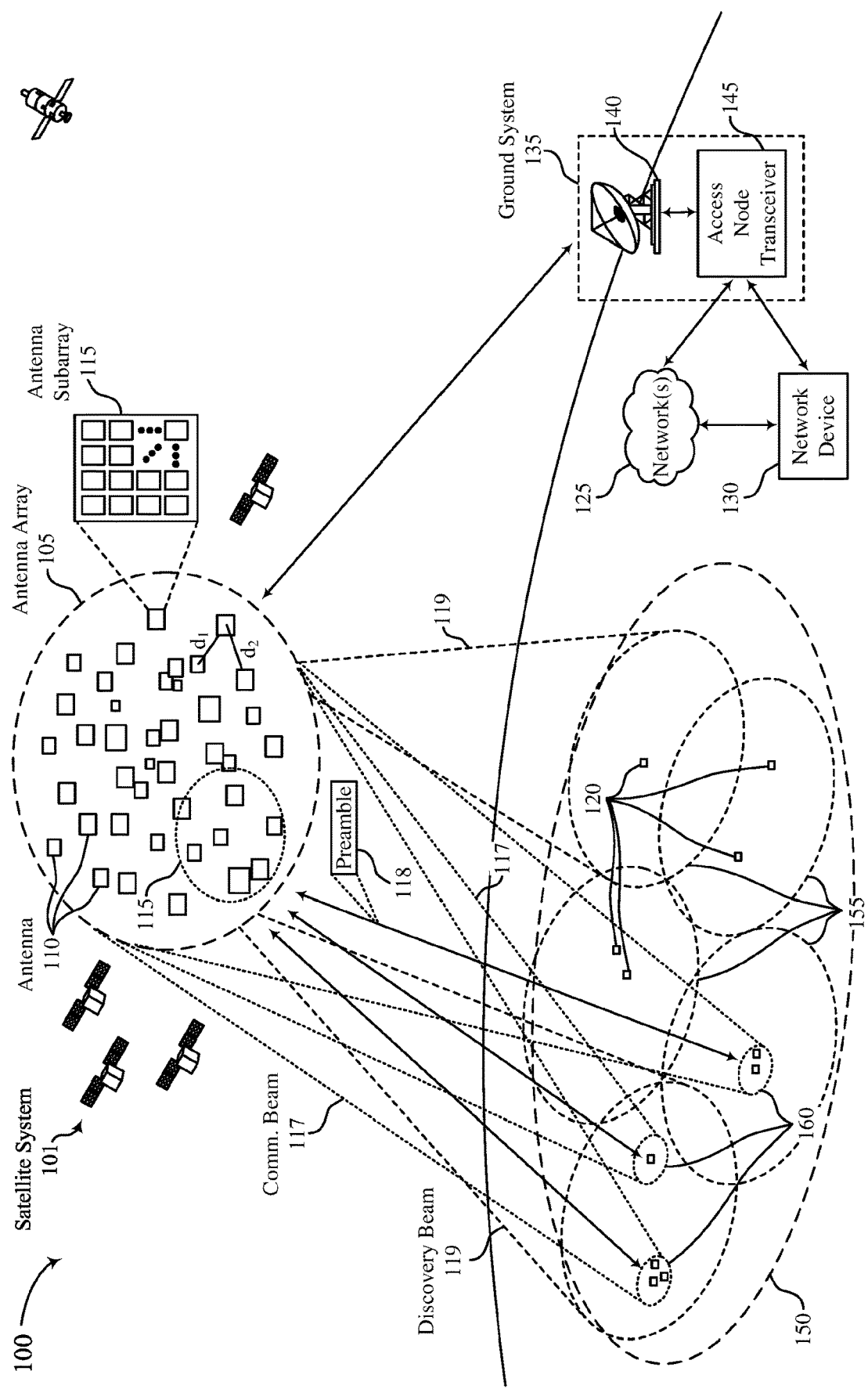
FIG. 1 shows an example of a satellite communications system that supports beamforming using sparse antenna arrays in accordance with examples described herein.

A communications system (e.g., a satellite system) may include devices (e.g., satellites) equipped with multiple antennas. The communications system may use the devices to support concurrent communications by multiple terminals. In some examples, the communications system may use the devices to support beamformed communications. Beamforming communications may be used to increase a utilization of communication resources—e.g., by enabling wireless spectrum to be reused in different regions of a geographic area. In some examples, beamforming techniques may use the multi-antenna devices to form a set of spot beams that cover a geographic area (e.g., in a partially overlapping pattern).

Although beamforming techniques may be used to increase spectrum utilization, the resolution of beamforming techniques may be limited—e.g., based on a size of an antenna array. In some examples, the coverage areas of the spot beams are based on a size of an antenna array of the satellite system, a frequency used by the satellite system, an orbit used by the satellite system (e.g., a geosynchronous earth orbit). For a typical satellite payload (e.g., an array fed reflector, where the reflector spans 10 to 30 meters) coverage areas of spot beams formed by a satellite system on the surface of the Earth may be relatively large (e.g., hundreds or thousands of kilometers in diameter). Thus, the use of current beamforming techniques to increase a reuse of frequency resources (e.g., by using smaller spot beams) may be limited.

To increase a resolution of beamforming and support an increased quantity of users within a geographic area, techniques described herein may use a large, sparse antenna array having antennas with inter-element spacing that is different across the antenna array. Current antenna arrays may be rigid and have consistent inter-element spacing, and thus, developing large antenna arrays using current techniques may be infeasible. In some examples, the large, sparse antenna array may span a large distance (e.g., greater than a kilometer) based on using flexible antenna arrays having different inter-element spacing. In some cases, the inter-element spacing may change over time (e.g., due to drift of antennas relative to each other). In some cases, the antennas of a large, sparse antenna array may be grouped into sets of antennas (e.g., antenna subarrays), where each set of antennas may be used to form a beam (e.g., a discovery beam). Also, the antennas of multiple sets of the large, sparse antenna array may be used to form one or more beams (e.g., one or more communication beams).

In some examples, the large, sparse antenna array may be used (e.g., in combination with respective beam coefficients to form discovery beams within a geographic area, where each discovery beam may be formed by a corresponding set of antennas of the antenna array and cover a discovery area within the geographic area. Preambles transmitted from terminals within a discovery area of a discovery beam may be detected using the antenna array. Based on detecting a preamble using a discovery beam, a presence of a terminal in a corresponding discovery area may be determined. Based on determining the presence of the terminal, signals detected at a second set of antennas of the antenna array may be processed according to beam coefficients to obtain a beam signal of a communication beam that includes a beam coverage area encompassing a position of the terminal. Each detected signal may comprise a respective component of a signal transmitted by the terminal.

FIG. 1 shows an example of a satellite communications system 100 that supports beamforming using sparse antenna arrays in accordance with examples described herein. Satellite communications system 100 may include a ground system 135, terminals 120, and satellite system 101. The ground system 135 may include a network of access nodes 140 that are configured to communicate with the satellite system 101. The access nodes 140 may be coupled with access node transceivers 145 that are configured to process signals received from and to be transmitted through corresponding access node(s) 140. The access node transceivers 145 may also be configured to interface with a network 125 (e.g., the Internet) e.g., via a network device 130 (e.g., a network operations center, satellite and gateway terminal command centers, or other central processing centers or devices) that may provide an interface for communicating with the network 125.

Terminals 120 may include various devices configured to communicate signals with the satellite system 101, which may include fixed terminals (e.g., ground-based stationary terminals) or mobile terminals such as terminals on boats, aircraft, ground-based vehicles, and the like. A terminal 120 may communicate data and information with an access node 140 via the satellite system 101. The data and information may be communicated with a destination device such as a network device 130, or some other device or distributed server associated with a network 125.

The satellite system 101 may include a single satellite, or a network of satellites that are deployed in space orbits (e.g., low earth orbits, medium earth orbits, geostationary orbits, etc.). One or more satellites included in satellite system 101 may be equipped with multiple antennas (e.g., one or more antenna arrays). In some examples, the one or more satellites equipped with multiple antennas may each include one or more antenna panels that include an array of evenly distributed antennas (which may also be referred to as antenna elements). In some examples, a satellite may be equipped with an antenna array including antennas that are unevenly distributed across a large region. In some examples, the antennas may be connected to a central entity via wired or wireless links. Deploying the antennas over the large region may increase an aperture size of the antenna array of the satellite relative to an antenna array that includes evenly distributed antennas (e.g., due to limitations associated with manufacturing and deploying a large antenna array with evenly distributed antennas). In some examples, a set of satellites, each including an antenna, are unevenly distributed across the large region, where each satellite may communicate with a central entity (e.g., a central server or ground station). In such cases, the antennas of the set of satellites may be used to form an antenna array. In some examples, a set of satellites, each including an antenna subarray, are unevenly distributed across the large region, where each satellite may communicate with a central entity (e.g., a central server or ground station) and where the antenna subarrays may include an array of evenly distributed antennas. In such cases, the antenna subarrays of the set of satellites may be used to form an antenna array.

The satellite system 101 may use the one or more satellites to support multiple-input multiple-output (MIMO) techniques to increase a utilization of frequency resources used for communications—e.g., by enabling wireless spectrum to be reused, in time and frequency, in different geographic regions of a geographic area. Similarly, the satellite system 101 may use the one or more satellites to support beamforming techniques to increase a utilization of frequency resources used for communications.

MIMO techniques may be used to exploit multipath signal propagation and increase spectral efficiency by transmitting or receiving multiple signals via different spatial layers. The multiple signals may, for example, be transmitted by a transmitting device (e.g., a satellite system) via a set of antennas in accordance with a set of weighting coefficients. Likewise, the multiple signals may be received by a receiving device (e.g., a satellite system) via a set of antennas in accordance with a set of weighting coefficients. Each of the multiple signals may be associated with a separate spatial stream and may carry bits associated with the same data stream (e.g., the same codeword) or different data streams (e.g., different codewords). MIMO techniques include single-user MIMO (SU-MIMO), where multiple spatial layers are used to communicate with one device, and multiple-user MIMO (MU-MIMO), where multiple spatial layers are used to communicate with multiple devices.

To determine weighting coefficients to apply to the set of antennas such that the N spatial layers are formed, an (M×N) MIMO matrix may be formed, where M may represent the quantity of antennas of the set of antennas. In some examples, M may be equal to N. The MIMO matrix may be determined based on a channel matrix and used to isolate the different spatial layers of the channel. In some examples, the weighting coefficients are selected to emphasize signals transmitted using the different spatial layers while reducing interference of signals transmitted in the other spatial layers. Accordingly, processing signals received at each antenna with the set of antennas (e.g., a signal received at the set of antennas) using the MIMO matrix may result in multiple signals being output, where each of the multiple signals may correspond to one of the spatial layers. The elements of the MIMO matrix used to form the spatial layers of the channel may be determined based on channel sounding probes received at a satellite system 101—e.g., from one or more devices. In some examples, the weighting coefficients used for MIMO communications may be referred to as beam coefficients, and the multiple signals or spatial layers may be referred to as beam signals.

Beamforming techniques may be used to shape or steer a communication beam along a spatial path between a satellite system 101 and a geographic area. A communication beam may be formed by determining weighting coefficients for antenna elements of antenna array that result in the signals transmitted from or received at the antenna elements being combined such that signals propagating in a particular orientation with respect to an antenna array experience constructive interference while others experience destructive interference. Thus, beamforming may be used to transmit signals having energy that is focused in a direction of a communication beam and to receive signals that arrive in a direction of the communication with increased signal power (relative to the absence of beamforming). The weighting coefficients may be used to apply amplitude offsets, phase offsets, or both to signals carried via the antennas. In some examples, the weighting coefficients applied to the antennas may be used to form multiple beams associated with multiple directions, where the multiple beams may be used to communicate multiple signals having the same frequency at the same time. The weighting coefficients used for beamforming may be referred to as beam coefficients, and the multiple signals may be referred to as beam signals.

In some examples, beamforming techniques may be used by a satellite system 101 to form spot beams that are tiled (e.g., tessellated) across a geographic area. In some examples, the wireless spectrum used by a satellite system 101 may be reused across sets of the spot beams for communications between terminals 120 and the satellite system. In some examples, the wireless spectrum can be reused in spot beams that do not overlap, where a contiguous geographic region can be covered by overlapping spot beams that each use orthogonal resources (e.g., orthogonal time, frequency, or polarization resources).

To support an increased quantity of users within a geographic area, an antenna array (which may be referred to as a large, sparse antenna array) having antennas with inter-element spacing that is different across the antenna array may be used to increase a resolution of beamforming techniques. That is, the large, sparse antenna array may be used (e.g., in combination with respective beam coefficients) to form communication beams with small coverage areas (e.g., less than 10 kilometers in diameter). A large, sparse antenna array, such as antenna array 105, may include multiple antennas 110 (e.g., hundreds or thousands of antennas) that are unevenly distributed across an area—e.g., in space. In some examples, each antenna 110 is, or is installed on, an individual satellite. In other examples, the antennas 110 are installed on a single satellite, where each antenna 110 is tethered to a central location e.g., via a physical connection.

Additionally, the distance between the antennas 110 may be greater than a distance associated with a wavelength of signals supported for communication by the large, sparse antenna array—e.g., the distance between the antennas 110 may be greater than a distance associated with the wavelength. In some examples, the distance between the antennas 110 may be greater than ten times the wavelength. In some examples, a first distance ($d_1$) between a first antenna of the antennas 110 and a second antenna of the antennas 110 may be different than a second distance ($d_2$) between the second antenna and a third antenna of the antennas 110, and so on throughout antenna array 105. In some examples, a large, sparse antenna array includes multiple antenna subarrays 115 (e.g., tens or hundreds of antenna subarrays) that are unevenly distributed across the area. In some examples, the antenna subarrays may each include a group of the antennas 110. In some examples, the antenna subarrays 115 may each include antennas 110 (which may also be referred to as antenna elements) that are evenly distributed across a corresponding antenna subarray 115. In some examples, in addition to being large and sparse, the antenna array 105 may be random or semi-random such that the distances between the antennas 110 of the antenna array 105 may be uncontrolled or partially controlled (e.g., unconstrained in one or more dimensions, or allowed to drift in one or more dimensions relative to other antennas 110).

To form the small communication beams, geometric relationships between a geographic region and the antennas 110 of the large, sparse antenna array 105 may be used. In some examples, the geometric relationships between a geographic region and the antennas 110 of the large, sparse antenna array 105 may also be used to simplify the processing used for massive-MIMO techniques—e.g., based on the limited directions of signal incidence, location information known for the terminals, or any combination thereof.

In some examples, to support communicating using communication beams 117 with small coverage areas, a large, sparse antenna array 105 may be used (e.g., in combination with respective beam coefficients) to form discovery beams 119 within a geographic area 150, where each discovery beam 119 may be formed by a corresponding set of antennas 110 of the antenna array 105 and may cover a discovery area 155 within the geographic area 150. For example, each subarray 115 may form a discovery beam 119, and the discovery beams may be tiled across the geographic area 150. Preambles 118 transmitted from terminals 120 within a discovery area 155 of a discovery beam 119 may be detected using the large, sparse antenna array 105 (e.g., each subarray 115 may detect preambles 118 transmitted from within a corresponding discovery area 155). Based on detecting a preamble 118 using a discovery beam 119, a presence of a terminal 120 in a discovery area 155 of the discovery beam 119 may be determined. Based on detecting the presence of the terminal 120, a set of antennas 110 (e.g., antennas from more than one subarray 115, a substantial portion of antennas 110, a majority of antennas 110, or all of the antennas 110) of the antenna array 105 and corresponding beam coefficients may be selected to form a communication beam 117 (e.g., a small or narrow beam) having a beam coverage area 160 within the discovery area 155 that includes a position of the terminal 120. Subsequently, signals detected at the antenna array 105 may be processed according to the beam coefficients used to form the small communication beam 117, resulting in a beam signal for the small communication beam 117. In some examples, the beam signal may include one or more signals transmitted from one or more terminals positioned within the beam coverage area 160.

In some examples, antenna array 105 includes multiple antenna subarrays 115, where each antenna subarray 115 may be used to form a discovery beam 119 associated with a corresponding discovery area 155. Preambles from a set of terminals 120 may be detected using a subset of the discovery beams 119. Based on detecting the terminals using the subset of the discovery beams 119, communication beams 117 may be formed (e.g., using geometric interpretation or MIMO-based techniques) within the corresponding discovery areas 155, where beam coverage areas 160 of the communication beams 117 may encompass the detected terminals 120. Communications may be performed between the antenna array 105 and detected terminals 120 using the communication beams 117, where at least a subset of the communication beams 117 may reuse common time, frequency, and polarization resources.

Figure 2:
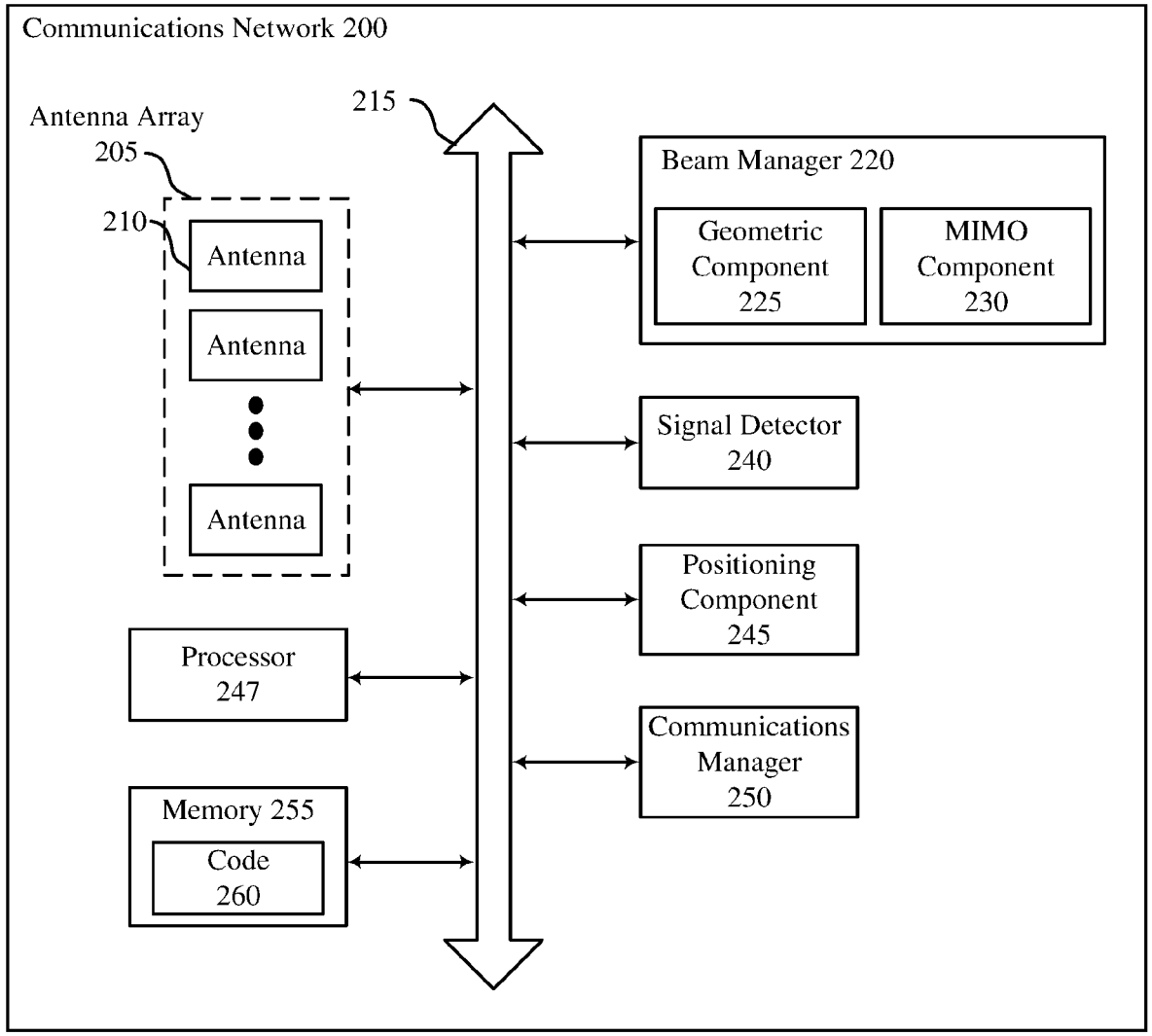
FIG. 2 shows an example of a communications network that supports beamforming using sparse antenna arrays in accordance with examples described herein.

FIG. 2 shows an example of a communications network 200 that supports beamforming using sparse antenna arrays in accordance with examples described herein.

Communications network 200 depicts a system for communicating using one or more of MIMO techniques, geometric interpretation techniques, and geometrically-informed MIMO techniques. Communications network 200 may include antenna array 205, bus 215, beam manager 220, signal detector 240, positioning component 245, processor 247, communications manager 250, and memory 255. At least a portion (e.g., all) of communications network 200 may be located within a space segment of communications network 200 (e.g., in a satellite system). In some examples, a portion of communications network 200 that is not included in the space segment may be located within a ground segment of communications network 200 (e.g., in a ground system). For example, antenna array 205, beam manager 220, signal detector 240, positioning component 245, processor 247, and memory 255 may be included in a space segment of communications network 200, while communications manager 250 may be included in a ground segment of communications network 200. In another example, antenna array 205 may be included in a space segment of communications network 200, while beam manager 220, signal detector 240, positioning component 245, processor 247, memory 255, and communications manager 250 may be included in a ground segment of communications network 200.

Antenna array 205 may be an example of the antenna array of FIG. 1 and may include antennas 210. The antennas 210 may be examples of the antennas 110 described with reference to FIG. 1. In some examples, one or more of the antennas 210 may be or include an antenna subarray, similar to the antenna subarray 115 described with reference to FIG. 1. The spacing between the antennas 210 may be different across antenna array 205. In some examples, a distance (e.g., an average distance) between the antennas 210 is greater than a distance associated with a wavelength of signals communicated using antenna array 205. In some examples, a distance (e.g., an average distance) between the antennas 210 is greater than a distance associated with ten times the wavelength of the signals communicated using antenna array 205.

Bus 215 may represent an interface over which signals may be exchanged between antenna array 205 and a central location that may be used to distribute the signal to the signal processing components of communications network 200 (e.g., beam manager 220, signal, signal detector 240, and positioning component 245. Bus 215 may include a collection of wires that connect to each of the antennas. Additionally, or alternatively, bus 215 may be a wireless interface that is used to wirelessly communicate signaling between antenna array 205 and the signal processing components—e.g., in accordance with a communication protocol.

Beam manager 220 may be configured to form beams, including discovery beams, communication beams, geometric interpretation-based beams, MIMO-based beams, and the like. In some examples, beam manager 220 may be configured to form one or more discovery beams (e.g., the discovery beams that cover the discovery areas 155 of FIG. 1) within a geographic area (e.g., geographic area 150 of FIG. 1) that is covered by the antenna array 205. To form the discovery beams, native antenna patterns of sets of the antennas 210 may be used, or may be combined with beamforming techniques, MIMO techniques, or a combination thereof.

Beam manager 220 may also be configured to form one or more communication beams (e.g., the communication beams that form the beam coverage areas 160 of FIG. 1). To form the communication beams, geometric interpretation-based beamforming techniques, MIMO techniques, or geometrically-informed MIMO techniques may be used. Beam manager 220 may include geometric component 225 and MIMO component 230.

Geometric component 225 may be configured to use a geometric relationship between a position of a terminal and a set (e.g., up to and including all) of the antennas 210 of antenna array 205 to form small communication beams (e.g., communication beams that have a diameter that is less than ten (10) km, or less than five (5) km). In some examples, geometric component 225 may determine beam coefficients (e.g., phase shifts, amplitude components) that may be used to align in time signals detected at different antennas 210 so that the signals may be summed together according to the spatial location of the terminal, increasing the signal strength of a transmitted signal associated with each of the detected signals. In some examples, geometric component 225 may determine a first set of beam coefficients associated with a first beam coverage area, a second set of beam coefficients associated with a second beam coverage area, and so on. Accordingly, geometric component 225 may independently determine and apply multiple sets of beam coefficients to signals received from antenna array 205, each set of beam coefficients associated with a different beam coverage area.

MIMO component 230 may be configured to use multipath signal propagation to form MIMO-based beams. In some examples, MIMO component 230 may receive channel sounding probes from a set of transmitters (e.g., terminals), where the structure of the channel sounding probes may be known to MIMO component 230 and where the channel sounding probes transmitted from different transmitters may be orthogonal to one another. MIMO component 230 may use the channel sounding probes to estimate the channel between antenna array 205 and the transmitters. Based on the estimated channel, MIMO component 230 may determine beam coefficients (e.g., amplitude and phase shifts) that may be used to reveal the spatial layers of the channel. In some examples, MIMO component 230 may determine beam coefficients that may be used to isolate signals transmitted over the spatial layers from one another—e.g., by, in each spatial layer, emphasizing the signals transmitted within the spatial layer and canceling interference from signals transmitted within other spatial layers. MIMO component 230 may determine a single set of beam coefficients that is applied to the signals detected at a set (e.g., all) of the antennas 210 at antenna array 205. The beam coefficients may be included in an M×N matrix, where a value of M may indicate the quantity of antennas 210 and a value of N may indicate the quantity of spatial layers, where the value of N may be less than or equal to the value of M.

Signal detector 240 may be configured to detect preambles transmitted from one or more terminals. In some examples, the preambles include repetitions of a waveform and are used to indicate the presence of a transmitting terminal. The preambles may also include positioning information (e.g., GPS coordinates). In some examples, the preamble is encoded and difficult to spoof—e.g., by using spreading codes, encrypted data, etc. In some examples, the preambles may be two-part preambles. For example, the preamble may include a first part used for detection of the preamble (e.g., the repetitions of the waveform) and a second part including the position information. In some examples, a first part of the preamble including the repetitions is transmitted first and the second part of the preamble including the positioning data is transmitted after a response from the communications network 200 acknowledging detection of the first part of the preamble is received.

Positioning component 245 may be configured to determine a position of one or more terminals that are detected within a geographic region—e.g., based on detecting the corresponding one or more preambles. In some examples, positioning component 245 determines the position of the one or more terminals based on positioning information received in the preamble. Additionally, or alternatively, positioning component 245 may determine the position of the one or more terminals based on dithering a beam coverage area of communication beam to determine a position of the beam coverage area that maximizes the signal quality for a terminal, where the terminal may be centered in the beam coverage area.

Communications manager 250 may be configured to process beam signals received from beam manager 220. Communications manager 250 may decode data symbols included in the beam signals. In some examples, communications manager 250 may configure different modes at beam manager 220. For example, communications manager 250 may configure a first mode at beam manager 220 that is used for discovering terminals in a geographic area. While the first mode is configured, beam manager 220 may use beamforming and/or MIMO techniques to form discovery areas. Communications manager 250 may also configure a second mode at beam manager 220 that is used for communication with terminals in the geographic area using small beams. While the second mode is configured, beam manager 220 may use geometric interpretation to form beam coverage areas for communicating with discovered terminals. In some examples, the first mode and the second mode may be simultaneously configured at beam manager 220. Thus, antenna array 205 may be used to simultaneously form discovery beams and communication beams. In the case where discovery beams and communication beams are formed concurrently, communication beams within a discovery beam may use different frequency, time, or polarization resources. Communications manager 250 may also configure a third mode at beam manager 220 that is used for communication with terminals in the geographic area using small beams. While the third mode is configured, beam manager 220 may use geometrically-informed MIMO to form beam coverage areas for communicating with discovered terminals. In some examples, the first mode and the third mode are configured simultaneously, and the second mode and the third mode are configured alternatively at beam manager 220.

Processor 247 may include an intelligent hardware device (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). The processor 247 may be configured to execute computer-readable instructions stored in a memory (e.g., memory 255) to cause the communications network 200 to perform various functions (e.g., functions or tasks supporting beamforming using sparse antenna arrays). For example, the communications network 200 or a component of the communications network 200 may include a processor 247 and memory 255 coupled to the processor 247 that are configured to perform various functions described herein.

The memory 255 may include random access memory (RAM) and/or read-only memory (ROM). The memory 255 may store code that is computer-readable and computer-executable. The code may include instructions that, when executed by the processor 247, cause the communications network 200 to perform various functions described herein. The code 260 may be stored in a non-transitory computer-readable medium such as system memory or another type of memory. In some cases, the code 260 may not be directly executable by the processor 247 but may cause a computer (e.g., when compiled and executed) to perform functions described herein. In some cases, the memory 255 may contain, among other things, a basic I/O system (BIOS) which may control basic hardware or software operation such as the interaction with peripheral components or devices.

In some examples, beam manager 220, signal detector 240, positioning component 245, communications manager 250, or various combinations or components thereof, may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, beam manager 220, signal detector 240, positioning component 245, communications manager 250, or various combinations or components thereof, may be implemented in code 260 (e.g., as communications management software or firmware), executed by processor 247. If implemented in code 260 executed by processor 247, the functions of beam manager 220, signal detector 240, positioning component 245, communications manager 250, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

Figure 3:
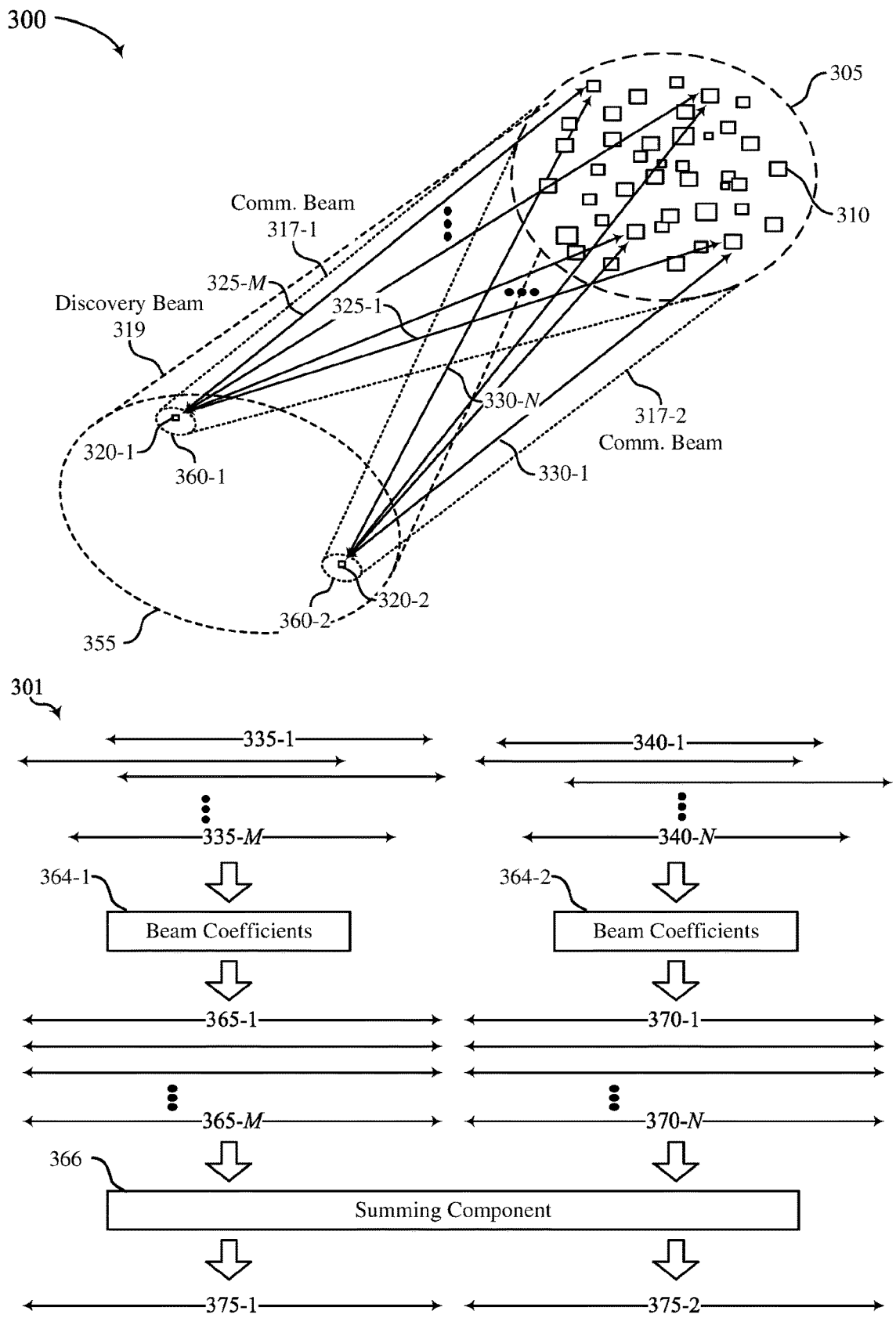
FIGS. 3 and 4 show examples of communications subsystems that support beamforming using sparse antenna arrays in accordance with examples described herein.

FIG. 3 shows an example of a communications subsystem 300 that supports beamforming using sparse antenna arrays in accordance with examples described herein. Communications subsystem 300 depicts communications between antenna array 305 and terminals 320 that are processed using geometric relationships between the antennas 310 of antenna array 305 and the terminals 320. In some examples, a first set of signals 325 are transmitted between first terminal 320-1 and antenna array 305, and a second set of signals 330 are transmitted between second terminal 320-2 and antenna array 305. In some examples, the first set of signals 325 may be associated with a single signal (e.g., a preamble or data signal) transmitted from first terminal 320-1 to antenna array 305, where the first set of signals 325 may be components (e.g., multipath components) of the signal transmitted from first terminal 320-1. In other examples, the first set of signals 325 may be associated with a single signal (e.g., a preamble response or data signal) obtained at antenna array 305 for transmission to first terminal 320-1, where the first set of signals 325 may be components (e.g., elements) of the signal transmitted from antenna array 305. Similarly, the second set of signals 330 may be associated with a single signal (e.g., a preamble or data signal) transmitted from second terminal 320-2 to antenna array 305 or a single signal (e.g., a preamble response or data signal) obtained at antenna array 305 for transmission to second terminal 320-2.

In some examples, a first set of the antennas 310 and first beam coefficients are used to form discovery beam 319 having discovery area 355. Signals received at antenna array 305 using the first set of the antennas 310 and the first beam coefficients may be analyzed to determine whether a preamble indicating the presence of a terminal is included in the signals. In some examples, the presence of first terminal 320-1 is detected based on first terminal 320-1 transmitting a preamble, where the first set of signals 325 may be signal components of the preamble transmission. The preamble may include a repeating waveform. In some examples, the waveform may be modulated with a spreading code before transmission or may include encoded data to increase a difficulty associated with spoofing the preamble. The preamble may also include positioning information—e.g., in a second part of the preamble.

In some examples, a position of first terminal 320-1 may be determined based on positioning information included in the preamble. Additionally, or alternatively, the position of first terminal 320-1 may be determined based on dithering a beam coverage area around discovery area 355 after detecting the presence of first terminal 320-1. The position of first terminal 320-1 may be determined based on a signal quality associated with first beam coverage area 360-1 satisfying a threshold, being higher than signal qualities associated with other beam coverage areas covered by the dithering operation, or both. The presence and position of second terminal 320-2 may similarly be detected based on a preamble transmitted from second terminal 320-2, where the second set of signals 330 may be signal components of the preamble transmission.

Second beam coefficients may be determined for first terminal 320-1 based on the position of first terminal 320-1. The second beam coefficients may also be determined based on a position of the antennas 310 relative to first terminal 320-1. The second beam coefficients, along with a second set of the antennas 310, may be used in the formation of first communication beam 317-1 having first beam coverage area 360-1. The second beam coefficients may be used to apply timing shifts (e.g., phase shifts) or amplitude weighting to signals detected at different antennas of the second set of the antennas 310, such that signals transmitted within first beam coverage area 360-1 are distinguishable from signals transmitted within adjacent beam coverage areas. In some examples, the second beam coefficients may be represented using an $M_1 \times 1$ vector, where $M_1$ may represent the quantity of antennas (e.g., 100 antennas, 1000 antennas, etc.) of the second set of the antennas 310. In some cases, the $M_1 \times 1$ vector may include coefficients for all of antennas 310, where some coefficients may be zero coefficients (e.g., the second set of antennas 310 that contribute to the first communication beam 317-1 may be a subset of the antennas 310).

Third beam coefficients may similarly be determined for second terminal 320-2. In some examples, the third beam coefficients may be represented using an $M_2 \times 1$ vector, where $M_2$ may represent the quantity of antennas (e.g., 100 antennas, 1000 antennas, etc.) of a third set of the antennas 310. In some examples, the third set of the antennas 310 and the second set of the antennas 310 are overlapping (e.g., partially or completely).

In some examples, the first set of the antennas 310 associated with discovery beam 319 may detect the first set of signals 325 within discovery area 360 and the second beam coefficients used to form first communication beam 317-1 may be determined. Based on the determining, the second beam coefficients may be applied to a subsequent set of detected signals (e.g., corresponding to a subsequent data signal transmitted by first terminal 320-1) that is output by the second set of the antennas 310 associated with first communication beam 317-1. In some examples, the second set of the antennas 310 includes most (e.g., greater than 50%, 60%, 70%, 80%, or 90%) of the antennas 310 at antenna array 305. In some cases, the second set of antennas 310 may include a portion (or all) of the first set of antennas 310 associated with discovery beam 319, where the second set of antennas 310 may include a larger quantity of the antennas 310 than the first set of antennas 310.

The first set of antennas 310 associated with discovery beam 319 may also detect the second set of signals 330 within discovery area 360 and the third beam coefficients used to form second communication beam 317-2 may be determined. Based on the determining, the third beam coefficients may be applied to a subsequent set of detected signals (corresponding to a subsequent data signal transmitted by second terminal 320-2) that is output by the third set of the antennas 310 associated with second communication beam 317-2. The third set of antennas 310 may be overlapping with the second set of antennas 310 e.g., may include a portion of or be the same as the second set of antennas 310. The second set of antennas 310 may also include most (e.g., greater than 50%, 60%, 70%, 80%, or 90%) of the antennas 310 at antenna array 305.

Signal diagram 301 depicts a first set of element signals 335 detected at the second set of antennas 310 associated with first communication beam 317-1 and a second set of element signals 340 detected at the third set of antennas 310 associated with second communication beam 317-2. Signal diagram 301 also depicts time delays associated with when the first set of element signals 335 and second set of element signals 340 are detected at respective antennas. The first set of element signals 335 may correspond to the first set of signals 325, and the second set of element signals 340 may correspond to the second set of signals 330. In some examples, the first set of element signals 335 and the first set of signals 325 may be associated with a data signal transmitted from first terminal 320-1. And the second set of element signals 340 and the second set of signals 330 may be associated with a data signal transmitted from second terminal 320-2.

Signal diagram 301 also depicts a result of applying first beam coefficients 364-1 (which may correspond to the second beam coefficients used to form first communication beam 317-1) to the first set of element signals 335 to obtain resulting element signals 365. In some examples, each beam coefficient of first beam coefficients 364-1 may be applied to a respective antenna of the second set of the antennas 310. Each beam coefficient of first beam coefficients 364-1 may be used to apply a time delay (e.g., a phase shift) or an amplitude weight, or both, to a signal received at a respective antenna element such that the resulting element signals 365 are aligned in time and can be combined (e.g., summed via summing component 366) with one another to form first beam signal 375-1 for first communication beam 317-1, where an SNR value of first beam signal 375-1 may be proportional to the quantity of element signals 365. In some examples, summing component 366 may include separate summing components that are used to sum the element signals obtained for respective communication beams.

Second beam coefficients 364-2 (which may correspond to the third beam coefficients used to form second communication beam 317-2) may similarly be applied to the second set of element signals 340 and the resulting element signals 370 may be combined (e.g., summed via summing component 366) to obtain second beam signal 375-2 for second communication beam 317-2. Accordingly, the beam coefficients used to form the communication beams 317 may be independently determined and applied to signals received at antennas 310.

In some examples, the transmission of the associated data signal from first terminal 320-1 and the associated data signal from second terminal 320-2 may overlap (e.g., partially or fully) with one another in time. In such cases, the first set of element signals 335 and the second set of element signals 340 may be superimposed, forming a composite signal. Also, in such cases, first beam coefficients 364-1 may be applied to the composite signals to obtain resulting element signals 365 and second beam coefficients 364-2 may be applied to the composite signal to obtain resulting element signals 370. In such cases, the undesired signals in the composite signals may result in noise in the resulting beam signal 375 and may approach being canceled for a large number of elements signals.

In some examples, the following equation may be used for determining beam signals received from multiple communication beams 317:

$$\text{CohSum}(t) = \sum_{i=1}^{N} A[\![i]\!] \, \text{Signal}[2\pi f_0(t - (t_{prop}[\![i]\!]|_{phySRF} - t_{prop}[\![i]\!]|_{EstSRF})) + \emptyset[ t_{prop}[\![i]\!]|_{phySRF} - t_{prop}[\![i]\!]|_{EstSRF}))]],$$

where $A^{t_{prop}[\![i]\!]}|_{phySRF} i t_{prop}[\![i]\!]|_{EstSRF}$ Signal corresponds to the signal received at the ith antenna of a set of antennas, $f_0$ is the carrier frequency of the signal, t is the current time, $t_{prop}[\![i]\!]|_{phySRF}$ is the time at which the signal is received at the ith antenna, $t_{prop}[\![i]\!]|_{EstSRF}$ is a quantized estimate of the time delay between the signal received at the ith antenna and the earliest signal received at the set of antennas, and Ø is the phase of the signal. The time delay between the signal recited at the ith antenna and the earliest signal received at the set of antennas represents the delay spread across the array at each ith antenna. Subtracting the individual delay may bring all signal samples into alignment— e.g., as if they were all co-located at the "earliest signal" arrival location.

Figure 4:
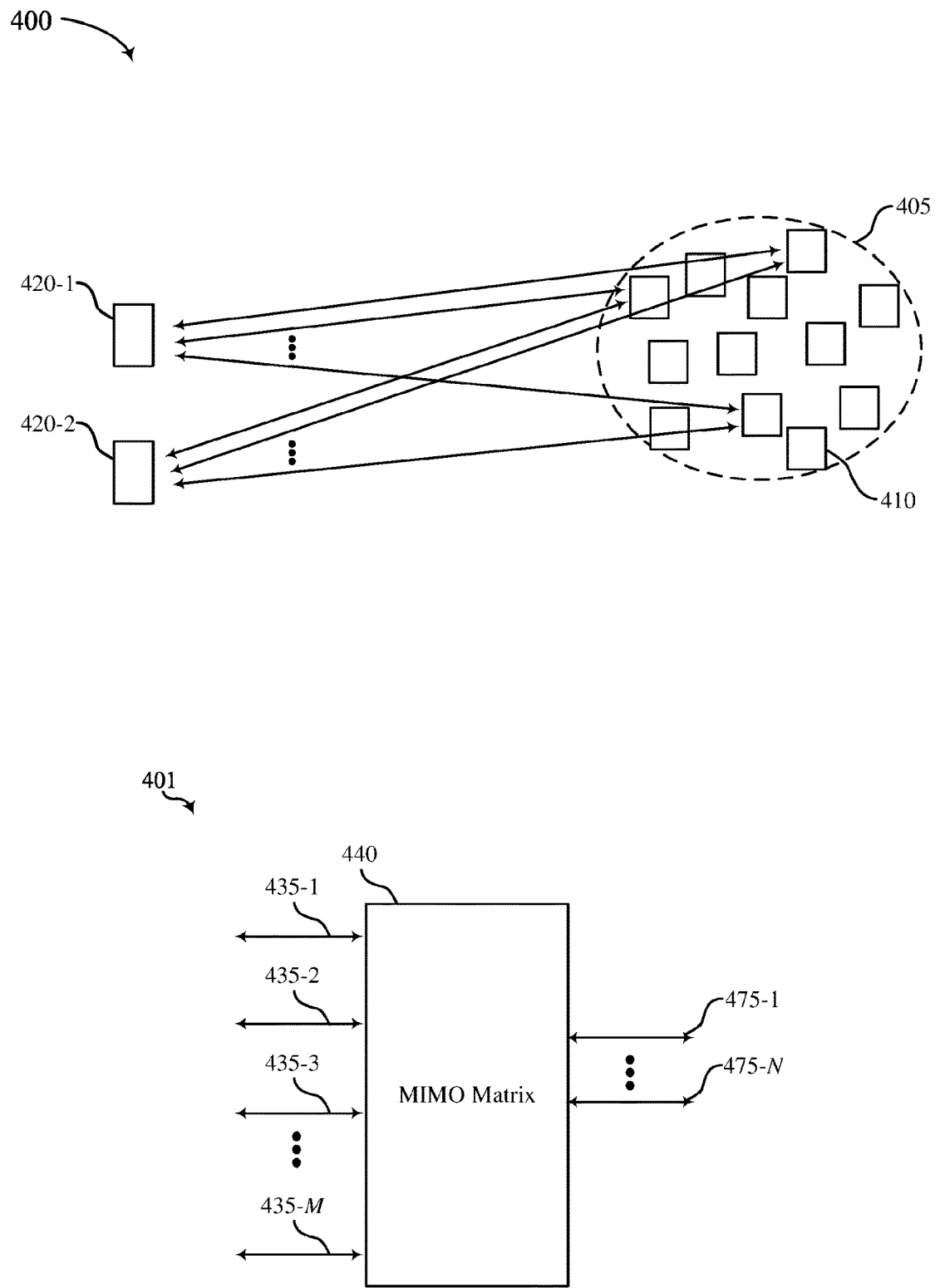

FIG. 4 shows an example of a communications subsystem 400 that supports beamforming using sparse antenna arrays in accordance with examples described herein. Communications subsystem 400 depicts communications between antenna array 405 and terminals 420 that are processing using MIMO processing or geometrically-informed MIMO processing. In some examples, first terminal 420-1 is an example of first terminal 320-1 of FIG. 3, and second terminal 420-2 is an example of second terminal 320-2 of FIG. 3.

The communication paths between the terminals 420 and antenna array 405 may be referred to as a channel. The channel may be composed of multiple spatial layers, where the multiple antennas 410 of antenna array 405 (along with a set of beam coefficients) may be used to expose the spatial layers of the channel. In some examples, the set of beam coefficients (which may also be referred to as MIMO coefficients) are selected to expose a first spatial layer of the channel that encompasses first terminal 420-1 (which may also be referred to as a communication beam or MIMO beam) and a second spatial layer of the channel that encompasses second terminal 420-2.

In some examples, the beam coefficients are determined based on channel sounding probes transmitted from the terminals 420. The channel sounding probes may have signal patterns that are known to the communications network and that can be used to adapt the beam coefficients to ensure that the spatial layers are focused on respective terminals (or groups of terminals). The channel sounding probes may also be orthogonal to one another. Estimation techniques, such as maximum ratio combining (MRC), minimum mean square error (MMSE), zero forcing, successive interference cancellation, maximum likelihood estimation, or neural network MIMO detection techniques, may be used to estimate the channel between antenna array 405 and the terminals 420, as well as to determine the beam coefficients. Because the beam coefficients are formed using channel sounding probes received from multiple terminals, the resulting beam coefficients may be dependent on channel sounding probes transmitted in different spatial layers. That is, the beam coefficients may be determined to decrease interference from the channel sounding probes on each other and changes to one beam coefficient may result in changes to other beam coefficients. Accordingly, the beam coefficients may be included in a single MIMO matrix (e.g., a M×N matrix, where M may represent the quantity of antennas 410 and N may represent the quantity of spatial streams), where the elements of the matrix may be dependent on one another.

In some examples, operations for determining the beam coefficients use high levels of processing and are highly complex. The amount of processing and complexity may increase as the quantity of antennas increases and as the quantity of spatial streams increases. In some examples, geometric relationships between terminals 420 and antennas 410 may be used to simplify the operations for determining the beam coefficients—e.g., by constraining the channel matrix, reducing the set of possible beam coefficients, or both. In some examples, the channel sounding probes may experience less scattering based on the relative positions of the terminals 420 and antenna array 405. Accordingly, the channel estimated using the channel sounding probes may be constrained, which may reduce a complexity associated with determining the beam coefficients.

The geometric relationships between terminals 420 and antennas 410 may enable the set of possible beam coefficients to be reduced for one or more of the following reasons the position of the antennas in space may reduce the amount of scattering and multipath components that are taken into consideration in a terrestrial application; the position of the antennas in space may reduce the angles from which the signals transmitted from terminals 420 may arrive; the time delays at the different antennas 410 may be utilized to determine spatial information that facilitates determining the beam coefficients, etc.

Signal diagram 401 may depict a first set of element signals 435 received at antenna array 405, where each element signal 435 may be received at a respective antenna e.g., first element signal 435-1 may correspond to a first antenna of the antennas 410. Each element signal 435 may receive signal components related to signals transmitted from first terminal 420-1 and second terminal 420-2 (and, in some examples, from other terminals), including direct path and multipath signals.

MIMO matrix 440 may be applied to the element signals 435, where the elements of MIMO matrix 440 may be previously determined using channel sounding probes transmitted from a set of terminals. After MIMO matrix 440 is applied to element signals 435, a set of beam signals 475 may be output, where the beam signals 475 may be associated with respective spatial layers of the channel that are exposed by MIMO matrix 440.

Figure 5:
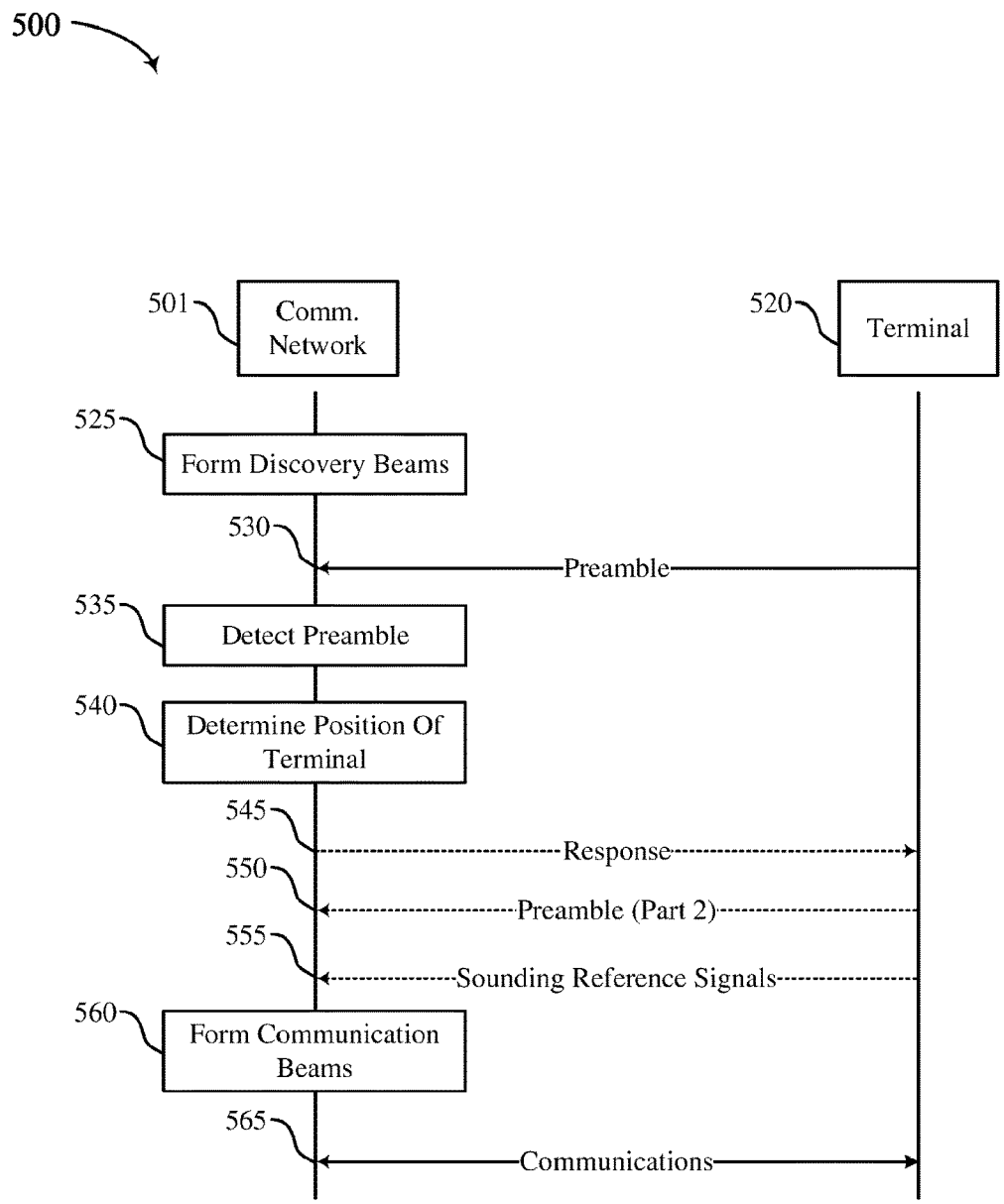
FIGS. 5 and 6 show examples of sets of operations for beamforming using sparse antenna arrays in accordance with examples described herein.

FIG. 5 shows an example set of operations for beamforming using sparse antenna arrays in accordance with examples described herein. Process flow 500 may be performed by communications network 501 and terminal 520, which may be respective examples of aspects of a communications network and terminal described above with reference to FIGS. 1 through 4. Communications network 501 may include an antenna array (e.g., antenna array 105 of FIG. 1), ground system (e.g., ground system 135 of FIG. 1), and network device (e.g., network device 130 of FIG. 1). In some examples, communications network 501 may be a satellite network.

In some examples, process flow 500 illustrates an exemplary sequence of operations performed to support beamforming using sparse antenna arrays. For example, process flow 500 depicts operations for discovering terminals and forming small communication beams using a sparse antenna array. One or more of the operations described in process flow 500 may be performed earlier or later in the process, omitted, replaced, supplemented, or combined with another operation. Also, additional operations described herein that are not included in process flow 500 may be included.

At 525, communications network 501 may form multiple discovery beams having respective discovery areas in a geographic area. In some examples, the discovery areas are swept across the geographic area—e.g., if the discovery areas do not cover the entire geographic region. In some examples, a perimeter of the geographic area is around 1000 km and a perimeter of the discovery areas is greater than 50 km.

Multiple sets of antennas in an antenna array of communications network 501 may be used (e.g., in combination with respective beam coefficients) to form respective discovery beams that are used to cover the geographic area. In some examples, each set of antennas may have native antenna patterns that are focused on a particular region of the geographic area (e.g., based on physical orientation, physical configuration, etc.), where the regions may correspond to the discovery areas. In some examples, each set of antennas includes less than 10% of the antennas of the antenna array. Also, the sets of antennas may include one or more common antennas. In some examples, respective sets of beam coefficients are applied to sets of signals received from each set of antennas to form the discovery beams having the discovery areas. In some examples, the values of the sets of beam coefficients may be adjusted—e.g., to sweep the discovery areas across the geographic area.

In some examples, MIMO techniques may be used to form the discovery beams having the discovery areas, where beam coefficients (e.g., a beam coefficient matrix) may be determined for a set of antennas (or antenna groups) of the antenna array that expose spatial layers of a channel that correspond to respective discovery areas. In some examples, the beam coefficients for the MIMO matrix may be based on channel sounding probes transmitted from known transmitters (e.g., reference terminals), which may be positioned in known locations. In some examples, one of the known transmitters is positioned within each of the discovery areas.

At 530, terminal 520 may transmit a preamble—e.g., in the direction of an antenna array of communications network 501. In some examples, terminal 520 may transmit the preamble to establish an initial connection to the communications network 501. The preamble may include repetitions of a waveform (e.g., up to one hundred repetitions). In some examples, the waveform is modulated by a spreading sequence to increase a difficulty associated with spoofing the preamble. Additionally, or alternatively, the waveform may be used to communicate an encoded message. The preamble may also include positioning information, such as global positioning coordinates—e.g., in a second part of the preamble. In some examples, the second part of the preamble is transmitted at a later time—e.g., in response to signaling received from communications network 501 that indicates reception of the preamble. In some examples, the preamble transmitted by terminal 520 may be unique relative to preambles transmitted from other terminals (or randomly selected from a set of preambles, such that the likelihood that nearby terminals select the same preamble is decreased).

At 535, communications network 501 may detect the preamble transmitted from terminal 520. In some examples, communications network 501 detects the preamble based on combining signals received during consecutive time intervals to obtain a combined signal, filtering the combined signal based on the waveform included in the preamble to obtain a filtered signal, and determining whether the filtered signal matches the waveform, an energy of the filtered signal exceeds a threshold, or both. For example, communications network 501 may detect the preamble based on determining that the energy of the filtered signal exceeds the threshold. In some examples, based on detecting the preamble, communications network 501 may also detect a second part of the preamble that includes positioning information.

At 540, communications network 501 may determine a position of terminal 520 based on detecting the preamble. In some examples, communications network 501 determines the position of terminal 520 based on positioning information included in the second part of the preamble. In some examples, communications network 501 determines the position of terminal 520 based on positioning information included in a second part of the preamble that is subsequently transmitted by terminal 520, as described with reference to 545 and 550.

In some examples, communications network 501 may determine a discovery area within which terminal 520 is positioned based on the preamble being received using a set of antennas and/or set of beamforming coefficients corresponding to the discovery area. Communications network 501 may further determine a refined position of the terminal 520 based on forming a communication beam and dithering a coverage area of the communication beam within the discovery area. In some examples, the communication beam is formed using a set of antennas of the antenna array (e.g., greater than 50%, 60%, 70%, 80%, or 90% of the antennas) and a perimeter of the communication beam may be less than 10 km or less than 5 km. The refined position of the terminal 520 may be determined based on comparing signal strengths of a signal transmitted from terminal 520 (e.g., the preamble or channel sounding probes) that are determined for the different coverage areas of the communication beam. In some examples, a single signal transmitted from terminal 520 is used to determine the position of the terminal based on communications network 501 applying different beam coefficients to signals detected at the antennas of the antenna array that correspond to the signal (and that, in some examples, are buffered or stored by communications network 501) and measuring the resulting signal strengths.

At 545, communications network 501 may transmit a response to the preamble transmitted from terminal 520. In some examples, the response may include a signal pattern used to indicate that the response is for the preamble transmitted from terminal 520. The response may include a request that terminal 520 transmit positioning information to communications network 501. Additionally, or alternatively, the response may include a request that terminal 520 transmit channel sounding probes—e.g., to assist in the determination of spatial layers of the channel between communications network 501 and a set of terminals within the geographic area, including terminal 520.

At 550, terminal 520 may transmit positioning information to communications network 501—e.g., based on receiving the response received from communications network 501. In some examples, the positioning information transmitted from terminal 520 is considered as a second part of the preamble transmitted by terminal 520.

At 555, terminal 520 may transmit channel sounding probes to communications network 501. In some examples, the channel sounding probes are transmitted based on receiving the response from communications network 501. The channel sounding probes may be included with the second part of the preamble or be considered as third part of the preamble transmitted by terminal 520.

At 560, communications network 501 may form one or more communication beams. In some examples, communications network 501 forms the one or more communication beams using a set of antennas that includes a majority (e.g., greater than 50%, 60%, 70%, 80%, or 90%) of the antennas at the antenna array, where the quantity of antennas associated with forming the communication beams may be greater than the quantity of antennas associated with forming the discovery beams. Communications network 501 may form a first communication beam having a beam coverage area that encompasses terminal 520.

In some examples, communications network 501 forms the one or more communication beams using beam coefficients determined based on MIMO processing. In some examples, communications network 501 determines a presence of multiple terminals (including terminal 520) and, communications network 501 may process channel sounding probes transmitted by the terminals to determine the beam coefficients that expose the different spatial layers of the channel corresponding to the different terminals. In some examples, communications network 501 determines a single set of beam coefficients to apply to signals received at a set of antennas (or antenna groups). The single set of beam coefficients may be selected to emphasize signals transmitted within a spatial layer while diminishing interference from signals transmitted in other spatial layers.

In some examples, communications network 501 forms the one or more communication beams using beam coefficients determined based on geometric relationships between terminals and the antennas of the antenna array (which may be referred to as geometric interpretation). For example, communications network 501 may form the first communication beam based on the determined position of terminal 520 and the determined positions of a set of antennas corresponding to the beam coefficients. The beam coefficients to apply to the signals detected at the antennas of the set of antennas may be determined based on the respective distances between the position of terminal 520 and the antennas. In some examples, the beam coefficients are time shifts (e.g., phase shifts). Communications network 501 may similarly form other communication beams based on determined positions of other terminals using respective beam coefficients. In some examples, the respective beam coefficients are determined independently of one another. Accordingly, the amount and complexity of processing associated with determining the respective beam coefficients may be reduced—e.g., relative to processing for determining a MIMO beam matrix.

In some examples, communications network 501 forms the one or more communication beams using beam coefficients that are determined based on a combination of MIMO processing and geometric interpretation (which may be referred to as geometrically-informed MIMO). Geometrically-informed MIMO may reduce a complexity of MIMO processing by using geometric relationships between terminals and the antenna array to reducing the set of possible beam coefficients that may be used to form the spatial layers of the channel between the terminals and the antenna array. For example, geometrically-informed MIMO may be simplified based on signals arriving in space from primarily one direction and with minimal angular differences. Also, the angle of arrival of multipath components of the signals that arrive at the antenna array may be predictable—e.g., due to the presence of a small quantity of scattering objects in space. By contrast, in a terrestrial system, for example, signals that are transmitted from devices to a base station may come from any direction and multipath components of the signals may be reflected from many different directions off of objects surrounding the base station. In some examples, the geometric relationships between the transmitters and the antennas of the antenna array may be used to further simplify the determination of a MIMO beam matrix.

In some examples, the beam coefficients used to form the one or more communication beams, using one or more of the above techniques, are determined at the antenna array of communications network 501. For example, a central processing component coupled with the antennas (e.g., wirelessly or by wired connection) may be used to determine the beam coefficients. Additionally, or alternatively, the antenna array may relay the detected signals to a ground system that may be used to determine the beam coefficients.

At 565, communications network 501 may exchange communications with terminal 520—e.g., using the communication beam associated with terminal 520. In some examples, terminal 520 transmits a signal to communications network 501 using the communication beam, and a set of antennas of the antenna array outputs element signals detected at the respective antennas. Communications network 501 may apply the first beam coefficients to the element signals—e.g., communications network 501 may apply individual beam coefficients of the first beam coefficients to corresponding signals of the element signals.

In some examples, communications network 501 transmits a signal to terminal 520 using the communication beam. Communications network 501 may apply the first beam coefficients to the signal to obtain multiple element signals that are transmitted using corresponding antennas of the antenna array.

Figure 6:
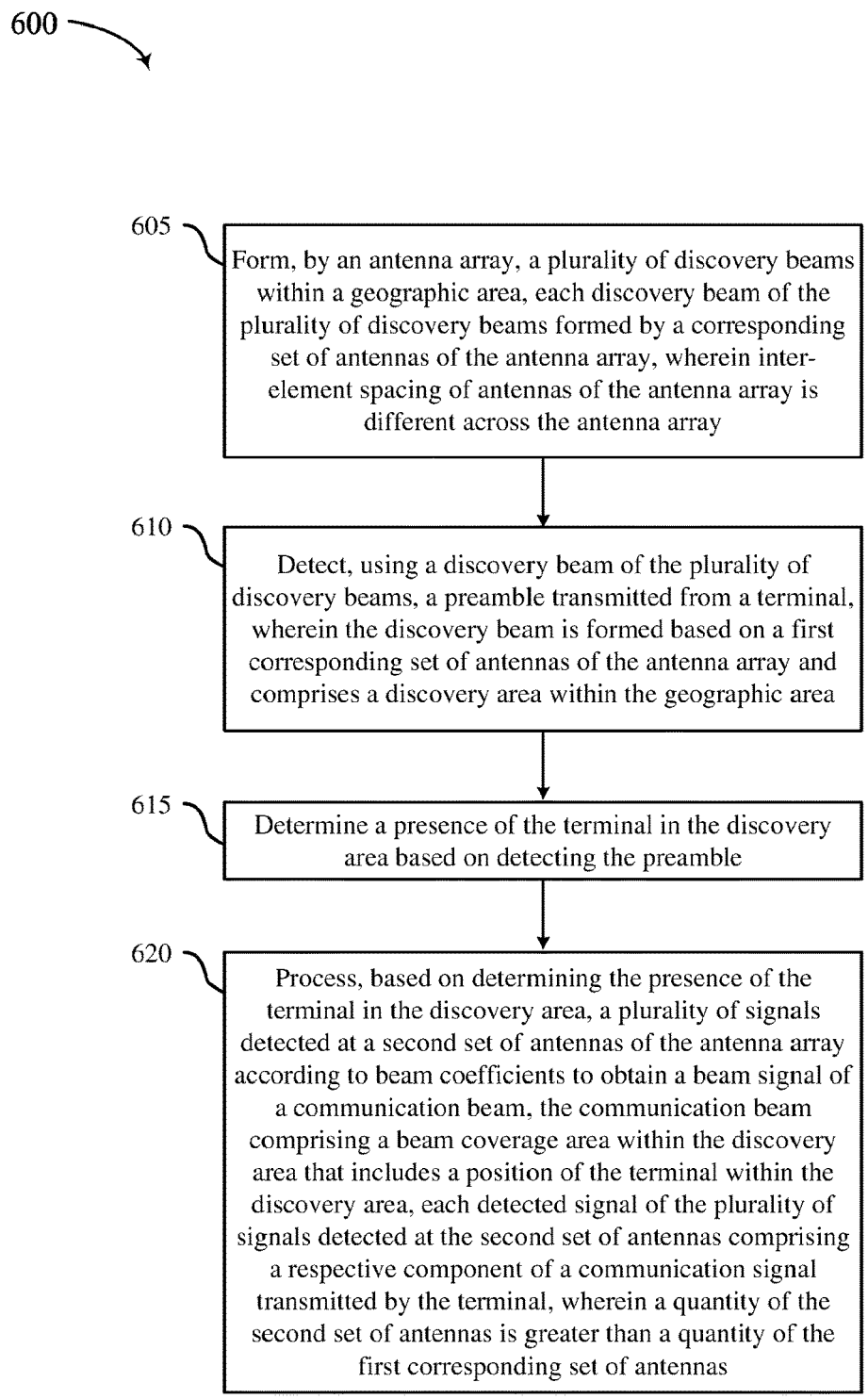

FIG. 6 shows an example set of operations for beamforming using sparse antenna arrays in accordance with examples described herein. Method 600 may be performed by components of an antenna array, ground system, or a combination thereof, which may be examples of a communications network (or components thereof) described with reference to FIGS. 1 and 2. In some examples, a communications network may execute a set of instructions to control the functional elements of the communications network to perform the described functions. Additionally, or alternatively, the communications network may perform aspects of the described functions using special-purpose hardware.

At 605, method 600 may include forming, by an antenna array, a plurality of discovery beams within a geographic area, each discovery beam of the plurality of discovery beams formed by a corresponding set of antennas of the antenna array, wherein inter-element spacing of antennas of the antenna array is different across the antenna array. The operations of 605 may be performed in accordance with examples as disclosed herein. In some examples, aspects of the operations of 605 may be performed by a beam manager, as described herein and with reference to FIG. 2.

At 610, method 600 may include detecting, using a discovery beam of the plurality of discovery beams, a preamble transmitted from a terminal, wherein the discovery beam is formed based on a first corresponding set of antennas of the antenna array and comprises a discovery area within the geographic area. The operations of 610 may be performed in accordance with examples as disclosed herein. In some examples, aspects of the operations of 610 may be performed by a signal detector, as described as described herein and with reference to FIG. 2.

At 615, method 600 may include determining a presence of the terminal in the discovery area based on detecting the preamble. The operations of 615 may be performed in accordance with examples as disclosed herein. In some examples, aspects of the operations of 615 may be performed by a positioning component, as described as described herein and with reference to FIG. 2.

At 620, method 600 may include processing, based on determining the presence of the terminal in the discovery area, a plurality of signals detected at a second set of antennas of the antenna array according to beam coefficients to obtain a beam signal of a communication beam, the communication beam comprising a beam coverage area within the discovery area that includes a position of the terminal within the discovery area, each detected signal of the plurality of signals detected at the second set of antennas comprising a respective component of a communication signal transmitted by the terminal, wherein a quantity of the second set of antennas is greater than a quantity of the first corresponding set of antennas. The operations of 620 may be performed in accordance with examples as disclosed herein. In some examples, aspects of the operations of 620 may be performed by a beam manager, as described as described herein and with reference to FIG. 2.

In some examples, an apparatus as described herein may perform a method or methods, such as the method 600. The apparatus may include, features, circuitry, logic, means, or instructions (e.g., a non-transitory computer-readable medium storing instructions executable by a processor) for forming, by an antenna array, a plurality of discovery beams within a geographic area, each discovery beam of the plurality of discovery beams formed by a corresponding set of antennas of the antenna array, wherein inter-element spacing of antennas of the antenna array is different across the antenna array; detecting, using a discovery beam of the plurality of discovery beams, a preamble transmitted from a terminal, wherein the discovery beam is formed based at least in part on a first corresponding set of antennas of the antenna array and comprises a discovery area within the geographic area; determining a presence of the terminal in the discovery area based at least in part on detecting the preamble; and processing, based at least in part on determining the presence of the terminal in the discovery area, a plurality of signals detected at a second set of antennas of the antenna array according to beam coefficients to obtain a beam signal of a communication beam, the communication beam comprising a beam coverage area within the discovery area that includes a position of the terminal within the discovery area, each detected signal of the plurality of signals detected at the second set of antennas comprising a respective component of a communication signal transmitted by the terminal, wherein a quantity of the second set of antennas is greater than a quantity of the first corresponding set of antennas.

In some examples, the apparatus may include, features, circuitry, logic, means, or instructions for determining the position of the terminal within the geographic area based at least in part on the preamble; and determining the beam coefficients based at least in part on the position of the terminal.

In some examples, the position of the terminal is determined based at least in part on positioning information for the terminal that is included in the preamble.

In some examples, the apparatus may include, features, circuitry, logic, means, or instructions for adjusting the beam coverage area of the communication beam; and determining a plurality of signal strengths for the beam signal based at least in part on adjusting the beam coverage area of the communication beam, wherein a position of the terminal is determined based at least in part on a center of the beam coverage area when a signal strength of the plurality of signal strengths satisfies a threshold.

In some examples, the preamble comprises a first portion comprising repetitions of a waveform used to indicate the presence of the terminal.

In some examples, the preamble comprises a second portion comprising positioning information for the terminal.

In some examples, the apparatus may include, features, circuitry, logic, means, or instructions for determining a position of antennas of the second set of antennas; and determining the beam coefficients based at least in part on the position of the antennas of the second set of antennas.

In some examples, the terminal is a first terminal, the communication signal is a first communication signal, and the apparatus may include, features, circuitry, logic, means, or instructions for detecting a second preamble transmitted from a second terminal; determining a presence of the second terminal based at least in part on detecting the second preamble; and processing, based at least in part on determining the presence of the second terminal in the discovery area, a second plurality of signals detected at the second set of antennas according to the beam coefficients to obtain a second beam signal of a second communication beam, the second communication beam comprising a second beam coverage area within the discovery area that includes a position of the second terminal within the discovery area, each detected signal of the second plurality of signals detected at the second set of antennas comprising a respective component of a second communication signal transmitted by the second terminal.

In some examples, the apparatus may include, features, circuitry, logic, means, or instructions for receiving a first set of channel sounding probes from the first terminal and a second set of channel sounding probes from the second terminal; determining an estimated channel between the first terminal, the second terminal, and the second set of antennas based at least in part on the first set of channel sounding probes and the second set of channel sounding probes; and determining the beam coefficients based at least in part on the estimated channel.

In some examples, the apparatus may include, features, circuitry, logic, means, or instructions for determining a geometric relationship between the terminal and the second set of antennas; and determining a set of potential beam coefficients based at least in part on the geometric relationship between the terminal and the second set of antennas, a quantity of the set of potential beam coefficients being reduced relative to a quantity of a set of available beam coefficients, wherein the beam coefficients are determined based at least in part on the set of potential beam coefficients.

In some examples, the second set of antennas are positioned in a satellite orbit.

In some examples, the second preamble is detected using the discovery beam, and the presence of the second terminal is determined in the discovery area based at least in part on the second preamble being detecting using the discovery beam.

In some examples, the second preamble is detected using a second discovery beam that is formed by a third set of antennas of the antenna array and comprises a second discovery area within the geographic area, and the presence of the second terminal is determined in the second discovery area based at least in part on the second preamble being detecting using the second discovery beam.

In some examples, the terminal is a first terminal, the communication signal is a first communication signal, and the apparatus may include, features, circuitry, logic, means, or instructions for detecting a second preamble transmitted from a second terminal; determining a presence of the second terminal based at least in part on detecting the second preamble; and processing, based at least in part on determining the presence of the second terminal in the discovery area, a second plurality of signals detected at a third set of antennas according to second beam coefficients to obtain a second beam signal of a second communication beam, the second communication beam comprising a second beam coverage area within the discovery area that includes a position of the second terminal within the discovery area, each detected signal of the second plurality of signals detected at the second set of antennas comprising a respective component of a second communication signal transmitted by the second terminal.

In some examples, the apparatus may include, features, circuitry, logic, means, or instructions for determining the second beam coefficients based at least in part on the position of the second terminal.

In some examples, the third set of antennas and the second set of antennas are at least partially overlapping sets.

In some examples, the second preamble is detected using the discovery beam, and the presence of the second terminal is determined in the discovery area based at least in part on the second preamble being detecting using the discovery beam.

In some examples, the second preamble is detected using a second discovery beam that is formed by a fourth set of antennas of the antenna array and comprises a second discovery area within the geographic area, and the presence of the second terminal is determined in the second discovery area based at least in part on the second preamble being detecting using the second discovery beam.

In some examples, the apparatus may include, features, circuitry, logic, means, or instructions for detecting a plurality of preambles transmitted from a plurality of terminals, the plurality of preambles comprising the preamble and the plurality of terminals comprising the terminal; determining presences of the plurality of terminals in a plurality of discovery areas that comprises the discovery area; and processing, based at least in part on determining the presence of the plurality of terminals in the plurality of discovery areas, pluralities of signals detected at a plurality of sets of antennas according to a plurality of beam coefficients to obtain a plurality of beam signals of a plurality of communication beams that comprise the communication beam.

In some examples, to process the plurality of signals according to the beam coefficients comprise, the apparatus may include, features, circuitry, logic, means, or instructions for aligning in time a beginning of the plurality of components of the communication signal based at least in part on the beam coefficients, the beam coefficients being based at least in part on the position of the terminal and a position of antennas of the second set of antennas; and summing the plurality of components of the communication signal based at least in part on the aligning.

In some examples, the beam coverage area is smaller than the discovery area based at least in part on the quantity of the second set of antennas being greater than the quantity of the first corresponding set of antennas.

In some examples, a diameter of the discovery area is less than 150 kilometers and a diameter of the beam coverage area is less than 20 kilometers.

In some examples, the terminal is a first terminal, and the apparatus may include, features, circuitry, logic, means, or instructions for forming, using a third set of antennas prior to detecting the preamble, a plurality of communication beams within the geographic area, the third set of antennas comprising the first corresponding set of antennas; and receiving, in a second signal that comprises the preamble transmitted from the first terminal and a second communication signal transmitted from a second terminal, the preamble via the discovery beam at the first corresponding set of antennas and the second communication signal via a second communication beam at the third set of antennas.

In some examples, the apparatus may include, features, circuitry, logic, means, or instructions for applying the beam coefficients to a second communication signal comprising data for the terminal to obtain a second beam signal comprising the data; and transmitting, from the second set of antennas to the terminal, a set of element signals used to form the second beam signal using a second communication beam that is based at least in part on the communication beam.

In some examples, the plurality of components of the communication signal are processed using analog beamforming techniques, digital beamforming techniques, or a combination thereof.

In some examples, the second set of antennas comprises the first corresponding set of antennas.

In some examples, the sets of antennas corresponding to the plurality of discovery beams are disjoint.

In some examples, the sets of antennas corresponding to the plurality of discovery beams are disjoint.

In some examples, the corresponding sets of antennas of the antenna array each comprise a plurality of antenna elements that are uniformly distributed across an antenna panel.

In some examples, the inter-element spacing of antennas of the antenna array is greater than a distance that is equivalent to a wavelength of signals communicated using the antenna array.

In some examples, the inter-element spacing of antennas of the antenna array is greater than a distance that is equivalent to ten wavelengths of signals communicated using the antenna array.

In some examples, a system as described herein may perform a method or methods, such as the method 600. The system may include a beam manager configured to form, using an antenna array, a plurality of discovery beams within a geographic area, each discovery beam of the plurality of discovery beams formed by a corresponding set of antennas of the antenna array, wherein inter-element spacing of antennas of the antenna array is different across the antenna array; a signal detector configured to detect, using a discovery beam of the plurality of discovery beams, a preamble transmitted from a terminal, wherein the discovery beam is formed based at least in part on a first corresponding set of antennas of the antenna array and comprises a discovery area within the geographic area; a positioning component configured to determine a presence of the terminal in the discovery area based at least in part on detecting the preamble, wherein the beam manager is further configured to process, based at least in part on determining the presence of the terminal in the discovery area, a plurality of signals detected at a second set of antennas of the antenna array according to beam coefficients to obtain a beam signal of a communication beam, the communication beam comprising a beam coverage area within the discovery area that includes a position of the terminal within the discovery area, each detected signal of the plurality of signals detected at the second set of antennas comprising a respective component of a communication signal transmitted by the terminal, and wherein a quantity of the second set of antennas is greater than a quantity of the first corresponding set of antennas.

In some examples of the system, the positioning component is further configured to determine the position of the terminal within the geographic area based at least in part on the preamble, and the beam manager is further configured to determine the beam coefficients based at least in part on the position of the terminal.

In some examples of the system, the beam manager is further configured to adjust the beam coverage area of the communication beam, and the signal detector is further configured to determine a plurality of signal strengths for the beam signal based at least in part on adjusting the beam coverage area of the communication beam, wherein a position of the terminal is determined based at least in part on a center of the beam coverage area when a signal strength of the plurality of signal strengths satisfies a threshold.

In some examples of the system, the positioning component is further configured to determine a position of antennas of the second set of antennas, and the beam manager is further configured to determine the beam coefficients based at least in part on the position of the antennas of the second set of antennas.

In some examples of the system, the terminal is a first terminal, the communication signal is a first communication signal, the signal detector is further configured to detect a second preamble transmitted from a second terminal, and the positioning component is further configured to determining a presence of the second terminal based at least in part on detecting the second preamble; the communications network further comprising a MIMO component configured to process, based at least in part on determining the presence of the second terminal in the discovery area, a second plurality of signals detected at the second set of antennas according to the beam coefficients to obtain a second beam signal of a second communication beam, the second communication beam comprising a second beam coverage area within the discovery area that includes a position of the second terminal within the discovery area, each detected signal of the second plurality of signals detected at the second set of antennas comprising a respective component of a second communication signal transmitted by the second terminal.

In some examples of the system, the signal detector is further configured to receive a first set of channel sounding probes from the first terminal and a second set of channel sounding probes from the second terminal, and the MIMO component is further configured to: determine an estimated channel between the first terminal, the second terminal, and the second set of antennas based at least in part on the first set of channel sounding probes and the second set of channel sounding probes; and determine the beam coefficients based at least in part on the estimated channel.

In some examples of the system, a geometric component configured to determine a geometric relationship between the terminal and the second set of antennas, wherein the MIMO component is further configured to determine a set of potential beam coefficients based at least in part on the geometric relationship between the terminal and the second set of antennas, a quantity of the set of potential beam coefficients being reduced relative to a quantity of a set of available beam coefficients, wherein the beam coefficients are determined based at least in part on the set of potential beam coefficients.

In some examples of the system, the geometric component is further configured to determine the second beam coefficients based at least in part on the position of the second terminal.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for communications, comprising:
   forming, by an antenna array implemented on one or more satellites, a plurality of discovery beams within a geographic area, each discovery beam of the plurality of discovery beams formed by a corresponding antenna subarray of the antenna array, wherein the antenna subarrays of the antenna array are deployed in a space orbit, wherein each antenna subarray of the antenna subarrays comprises a respective set of evenly distributed antennas, and wherein a distance between adjacent antenna subarrays of the antenna array is different across the antenna array;
   detecting, using a first discovery beam of the plurality of discovery beams, a first preamble transmitted from a first terminal, wherein the first discovery beam is formed using a first antenna subarray of the antenna array and comprises a first discovery area within the geographic area;
   detecting, using a second discovery beam of the plurality of discovery beams, a second preamble transmitted from a second terminal, wherein the second discovery beam is formed using a second antenna subarray of the antenna array and comprises a second discovery area within the geographic area;
   determining a presence of the first terminal in the first discovery area based at least in part on detecting the first preamble and a presence of the second terminal in the second discovery area based at least in part on detecting the second preamble; and
   processing, based at least in part on determining the presence of the first terminal in the first discovery area, a plurality of signals transmitted from the first terminal and detected at the first antenna subarray and the second antenna subarray according to beam coefficients to obtain a beam signal of a communication beam, the communication beam comprising a beam coverage area within the first discovery area that includes a position of the first terminal within the first discovery area, each detected signal of the plurality of signals comprising a respective component of a communication signal transmitted by the first terminal, wherein a quantity of antennas distributed across the first antenna subarray and the second antenna subarray that detect the plurality of signals is greater than a quantity of antennas at the first antenna subarray used to form the first discovery beam.

2. The method of claim 1, further comprising:
   determining the position of the first terminal within the geographic area based at least in part on the first preamble; and
   determining the beam coefficients based at least in part on the position of the first terminal.

3. The method of claim 2, wherein the position of the first terminal is determined based at least in part on positioning information for the first terminal that is included in the first preamble.

4. The method of claim 2, further comprising:
   adjusting the beam coverage area of the communication beam; and
   determining a plurality of signal strengths for the beam signal based at least in part on adjusting the beam coverage area of the communication beam, wherein the position of the first terminal is determined based at least in part on a center of the beam coverage area when a signal strength of the plurality of signal strengths satisfies a threshold.

5. The method of claim 1, wherein the first preamble comprises a first portion comprising repetitions of a waveform used to indicate the presence of the first terminal.

6. The method of claim 5, wherein the first preamble comprises a second portion comprising positioning information for the first terminal.

7. The method of claim 1, further comprising:
   determining a position of the antennas distributed across the first antenna subarray and the second antenna subarray that detect the plurality of signals; and determining the beam coefficients based at least in part on the position of the antennas distributed across the first antenna subarray and the second antenna subarray.

8. The method of claim 1, wherein the communication signal is a first communication signal, and the method further comprises:
processing, based at least in part on determining the presence of the second terminal in the second discovery area, a second plurality of signals transmitted from the second terminal and detected at the first antenna subarray and the second antenna subarray according to the beam coefficients to obtain a second beam signal of a second communication beam, the second communication beam comprising a second beam coverage area within the second discovery area that includes a position of the second terminal within the second discovery area, each detected signal of the second plurality of signals comprising a respective component of a second communication signal transmitted by the second terminal.

9. The method of claim 8, further comprising:
receiving a first set of channel sounding probes from the first terminal and a second set of channel sounding probes from the second terminal;
determining an estimated channel between the first terminal, the second terminal, and the first antenna subarray and the second antenna subarray based at least in part on the first set of channel sounding probes and the second set of channel sounding probes; and
determining the beam coefficients based at least in part on the estimated channel.

10. The method of claim 9, further comprising:
determining a geometric relationship between the first terminal and the first antenna subarray and the second antenna subarray; and
determining a set of potential beam coefficients based at least in part on the geometric relationship between the first terminal and the first antenna subarray and the second antenna subarray, a quantity of the set of potential beam coefficients being reduced relative to a quantity of a set of available beam coefficients, wherein the beam coefficients are determined based at least in part on the set of potential beam coefficients.

11. The method of claim 1, wherein the communication signal is a first communication signal, and the method further comprises:
detecting, using the first discovery beam, a third preamble transmitted from a third terminal;
determining a presence of the third terminal in the first discovery area based at least in part on detecting the third preamble; and
processing, based at least in part on determining the presence of the third terminal in the first discovery area, a second plurality of signals transmitted from the third terminal and detected at the first antenna subarray and the second antenna subarray according to second beam coefficients to obtain a second beam signal of a second communication beam, the second communication beam comprising a second beam coverage area within the first discovery area that includes a position of the third terminal within the first discovery area, each detected signal of the second plurality of signals comprising a respective component of a second communication signal transmitted by the third terminal.

12. The method of claim 11, further comprising:
determining the second beam coefficients based at least in part on the position of the second terminal.

13. The method of claim 1, further comprising:
detecting a plurality of preambles transmitted from a plurality of terminals, the plurality of preambles comprising the first preamble and the second preamble and the plurality of terminals comprising the first terminal and the second terminal;
determining presences of the plurality of terminals in a plurality of discovery areas that comprises the first discovery area and the second discovery area; and
processing, based at least in part on determining the presence of the plurality of terminals in the plurality of discovery areas, pluralities of signals detected at a plurality of sets of antenna subarrays according to a plurality of beam coefficients to obtain a plurality of beam signals of a plurality of communication beams that comprise the communication beam.

14. The method of claim 1, wherein processing the plurality of signals according to the beam coefficients comprises:
aligning in time a beginning of a plurality of components of the communication signal based at least in part on the beam coefficients, the beam coefficients being based at least in part on the position of the first terminal and a position of the antennas distributed across the first antenna subarray and the second antenna subarray that detect the plurality of signals; and
summing the plurality of components of the communication signal based at least in part on the aligning.

15. The method of claim 1, wherein the beam coverage area is smaller than the first discovery area based at least in part on the quantity of the antennas distributed across the first antenna subarray and the second antenna subarray being greater than the quantity of the antennas at the first antenna subarray used to form the first discovery beam.

16. The method of claim 1, wherein a diameter of the first discovery area is less than 150 kilometers and a diameter of the beam coverage area is less than 20 kilometers, and wherein a perimeter of the first discovery area is greater than 50 kilometers.

17. The method of claim 1, the method further comprising:
forming, using the first antenna subarray and a fourth antenna subarray and prior to detecting the first preamble and the second preamble, a plurality of communication beams within the geographic area; and
receiving, concurrently, the first preamble transmitted from the first terminal via the first discovery beam formed by the first antenna subarray and a second communication signal transmitted from the second terminal via a second communication beam formed by the first antenna subarray and the fourth antenna subarray.

18. The method of claim 1, further comprising:
applying the beam coefficients to a second communication signal comprising data for the first terminal to obtain a second beam signal comprising the data; and
transmitting, from the first antenna subarray and the second antenna subarray to the first terminal, a set of signals used to form the second beam signal using a second communication beam that is based at least in part on the communication beam.

19. The method of claim 1, wherein a plurality of components of the communication signal are processed using analog beamforming techniques, digital beamforming techniques, or a combination thereof.

20. The method of claim 1, wherein the inter element spacing of distance between adjacent antenna subarrays of the antenna array is greater than a distance that is equivalent to a wavelength of signals communicated using the antenna array.

21. The method of claim 1, wherein the distance between adjacent antenna subarrays of the antenna array is greater than a distance that is equivalent to ten wavelengths of signals communicated using the antenna array.

22. A communications network, comprising:
a beam manager configured to form, using an antenna array implemented on one or more satellites, a plurality of discovery beams within a geographic area, each discovery beam of the plurality of discovery beams formed by a corresponding antenna subarray of the antenna array, wherein the antenna subarrays of the antenna array are deployed in a space orbit, wherein each antenna subarray of the antenna subarrays comprises a respective set of evenly distributed antennas, and wherein a distance between adjacent antenna subarrays of the antenna array is different across the antenna array;
a signal detector configured to:
   detect, using a first discovery beam of the plurality of discovery beams, a first preamble transmitted from a first terminal, wherein the first discovery beam is formed using a first antenna subarray of the antenna array and comprises a first discovery area within the geographic area, and
   detect, using a second discovery beam of the plurality of discovery beams, a second preamble transmitted from a second terminal, wherein the second discovery beam is formed using a second antenna subarray of the antenna array and comprises a second discovery area within the geographic area;
a positioning component configured to determine a presence of the first terminal in the first discovery area based at least in part on detecting the first preamble and a presence of the second terminal in the second discovery area based at least in part on detecting the second preamble,
wherein the beam manager is further configured to process, based at least in part on determining the presence of the first terminal in the first discovery area, a plurality of signals transmitted from the first terminal and detected at the first antenna subarray and the second antenna subarray according to beam coefficients to obtain a beam signal of a communication beam, the communication beam comprising a beam coverage area within the first discovery area that includes a position of the first terminal within the first discovery area, each detected signal of the plurality of signals comprising a respective component of a communication signal transmitted by the first terminal, and
wherein a quantity of antennas distributed across the first antenna subarray and the second antenna subarray that detect the plurality of signals is greater than a quantity of antennas at the first antenna subarray used to form the first discovery beam.

23. The communications network of claim 22, wherein:
the positioning component is further configured to determine the position of the first terminal within the geographic area based at least in part on the first preamble, and
the beam manager is further configured to determine the beam coefficients based at least in part on the position of the first terminal.

24. The communications network of claim 23, wherein:
the beam manager is further configured to adjust the beam coverage area of the communication beam, and
the signal detector is further configured to determine a plurality of signal strengths for the beam signal based at least in part on adjusting the beam coverage area of the communication beam, wherein the position of the first terminal is determined based at least in part on a center of the beam coverage area when a signal strength of the plurality of signal strengths satisfies a threshold.

25. The communications network of claim 22, wherein:
the positioning component is further configured to a position of the antennas distributed across the first antenna subarray and the second antenna subarray that detect the plurality of signals, and
the beam manager is further configured to determine the beam coefficients based at least in part on the position of the antennas distributed across the first antenna subarray and the second antenna subarray.

26. The communications network of claim 22, wherein the communication signal is a first communication signal, the communications network further comprising:
a multiple-input multiple-output component configured to process, based at least in part on determining the presence of the second terminal in the second discovery area, a second plurality of signals transmitted from the second terminal and detected at the first antenna subarray and the second antenna subarray according to the beam coefficients to obtain a second beam signal of a second communication beam, the second communication beam comprising a second beam coverage area within the second discovery area that includes a position of the second terminal within the second discovery area, each detected signal of the second plurality of signals comprising a respective component of a second communication signal transmitted by the second terminal.

27. The communications network of claim 26, wherein:
the signal detector is further configured to receive a first set of channel sounding probes from the first terminal and a second set of channel sounding probes from the second terminal, and
the MIMO component is further configured to:
   determine an estimated channel between the first terminal, the second terminal, and the first antenna subarray and the second antenna subarray based at least in part on the first set of channel sounding probes and the second set of channel sounding probes; and
   determine the beam coefficients based at least in part on the estimated channel.

28. The communications network of claim 27, further comprising:
a geometric component configured to determine a geometric relationship between the first terminal and the first antenna subarray and the second antenna subarray,
wherein the MIMO component is further configured to determine a set of potential beam coefficients based at least in part on the geometric relationship between the first terminal and the first antenna subarray and the second antenna subarray, a quantity of the set of potential beam coefficients being reduced relative to a quantity of a set of available beam coefficients, wherein the beam coefficients are determined based at least in part on the set of potential beam coefficients.

29. The communications network of claim 22, wherein:
the communication signal is a first communication signal,
the signal detector is further configured to detect, using the first discovery beam, a third preamble transmitted from a third terminal, and
the positioning component is further configured to determine a presence of the third terminal in the first discovery area based at least in part on detecting the third preamble, the communications network further comprising:
   a geometric component configured to process, based at least in part on determining the presence of the third terminal in the first discovery area, a second plurality of signals transmitted from the third terminal and detected at the first antenna subarray and the second antenna subarray according to second beam coefficients to obtain a second beam signal of a second communication beam, the second communication beam comprising a second beam coverage area within the first discovery area that includes a position of the third terminal within the first discovery area, each detected signal of the second plurality of signals comprising a respective component of a second communication signal transmitted by the third terminal.

30. The communications network of claim 29, wherein:
the geometric component is further configured to determine the second beam coefficients based at least in part on the position of the second terminal.

* * * * *